(12) United States Patent
Yajima et al.

(10) Patent No.: US 7,583,568 B2
(45) Date of Patent: Sep. 1, 2009

(54) FOCUS CONTROL DEVICE AND METHOD OF ADJUSTING FOCUS GAIN PRIOR TO FOCUS-SERVO OPERATION

(75) Inventors: Hirofumi Yajima, Tokyo (JP); Manabu Gocho, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 229 days.

(21) Appl. No.: 10/508,434

(22) PCT Filed: Mar. 26, 2004

(86) PCT No.: PCT/JP2004/004301

§ 371 (c)(1), (2), (4) Date: Oct. 24, 2005

(87) PCT Pub. No.: WO2004/088647

PCT Pub. Date: Oct. 14, 2004

(65) Prior Publication Data

US 2006/0077796 A1    Apr. 13, 2006

(30) Foreign Application Priority Data

Mar. 31, 2003  (JP) .............................. 2003-094855

(51) Int. Cl.
*G11B 7/00* (2006.01)
(52) U.S. Cl. .................................................. 369/44.29
(58) Field of Classification Search ........................ None
See application file for complete search history.

(56) References Cited

U.S. PATENT DOCUMENTS

| 4,613,961 A | * | 9/1986 | Aarts ....................... 369/44.32 |
| 5,347,502 A | * | 9/1994 | Yamada et al. ........... 369/44.29 |
| 5,862,111 A | | 1/1999 | Arai |
| 6,654,322 B2 | * | 11/2003 | Komoike et al. ......... 369/44.29 |

FOREIGN PATENT DOCUMENTS

| JP | 61-177644 | | 8/1986 |
| JP | 63-129530 | | 6/1988 |
| JP | 63175232 A | * | 7/1988 |
| JP | 03259429 A | * | 11/1991 |
| JP | 04-098625 | | 3/1992 |
| JP | 05151587 A | * | 6/1993 |
| JP | 11039671 A | * | 2/1999 |

* cited by examiner

*Primary Examiner*—Peter Vincent Agustin (57) ABSTRACT

An optical pickup 4 that converts the reflected light from a laser light irradiated onto a disc into an electrical signal, is provided with an objective lens 42 that performs the irradiation of the laser light and reception of the reflected light and a biaxial actuator 43 that drives the objective lens 42. There are provided a focusing error signal detection unit 52 that detects the drive signal of the actuator using the electrical signal from the optical pickup 4, an actuator drive unit 56 that controls drive of the biaxial actuator 43 such that the objective lens 42 performs a focus pull-in action, using the drive signal, a focus gain setting section that sets the focus gain of the drive signal and a focus gain adjustment unit 54 that clips a drive signal waveform.

4 Claims, 8 Drawing Sheets

PRIOR ART

FOCUS CONTROL DEVICE AND METHOD OF ADJUSTING FOCUS GAIN PRIOR TO FOCUS-SERVO OPERATION

TECHNICAL FIELD

The present invention relates to a focus control device of an optical pickup in a recording/reproduction device for optical recording media and in particular relates to a focus control device and control method and focus control program with improved adjustment of the focus gain.

BACKGROUND ART

In disc devices that record and reproduce optical discs such as CDs or DVDs, the laser light is irradiated onto a recording surface through an optical pickup including an objective lens, and the signal that is recorded on the disc is read by converting the reflected light therefrom to an electrical signal. The optical pickup is arranged so as to be moveable in the focusing direction (vertically) and the tracking direction (left/right) in response to current flowing in the coils of an actuator; during reproduction the optical pickup must maintain a condition in which the focal point is located on the recording surface.

To achieve this, such a disc device is constructed so as to perform a focusing servo action whereby the objective lens position is finely adjusted in response to the current flowing in response to the amount of reflected light detected by a photodiode, called a detector, to which the reflected light from the recording surface is guided after being received by an objective lens and resolved by a beam splitter. For example, utilizing the fact that, if the light is out of focus, the main spot will not be circular, four equal zones may be defined centered on the main spot and the differences between the amounts of light, of the amounts of light in the zones, in prescribed pairs of these zones may be used as focusing error signals, which are then detected. In this way, control may be performed so as to pass currents to the coils with voltages corresponding thereto such that the optical pickup is moved in the direction such as to cancel these errors.

Such a focusing servo action is generally called a focusing pull-in action. However, this focusing pull-in action can only be performed in the range in which the focusing error signal can be detected i.e. in a narrow range before and after the position of the focal point. Consequently, in such disc devices, a construction is adopted such that the objective lens is moved vertically, called focus searching, and the focusing servo action is turned on at the time point where a focusing error signal is obtained (see Japanese Patent Application Laid-open No. H5-182206, Japanese Patent Application Laid-open No. H5-166195, Japanese Patent Application Laid-open No. H11-120599 and Japanese Patent Application Laid-open No. 2000-339704).

However, as described above, when the focusing servo action is performed, the amplitude of the focusing error signal for driving the actuator must be amplified to a prescribed value. The amplification factor of this focusing error signal is called the focus gain. For example, in order to raise the reproduction capability in respect of a disc using disc wobble, the focus gain during reproduction is set to a gain adapted to disc wobble.

Such setting of the focus gain is performed for example during focus searching that is performed respectively when changing over from the stopped condition to the disc reproduction condition of the reproduction device and when focus is lost due for example to scratches or vibration, and during layer jumping, that is performed on changing over the layer that is reproduced in a multi-layer disc such as a DVD.

Figure 6:
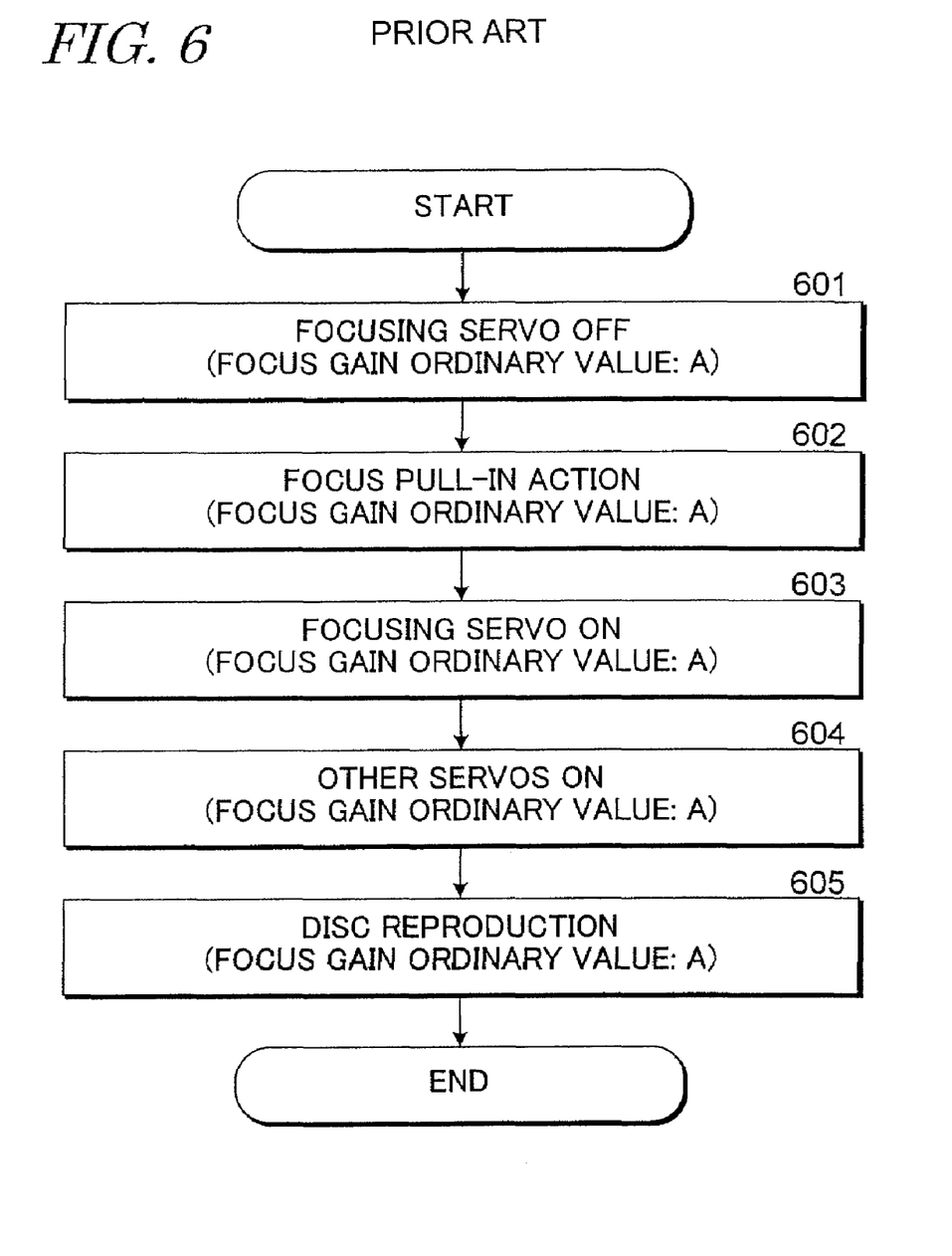
FIG. 6 is a flow chart showing the focus gain setting procedure during focus search in the prior art.

For example, the focus gain setting procedure that is performed during focus searching will be described with reference to the flow chart of FIG. 6. Specifically, a focus pull-in action is performed (step 602) after commencing focus searching from a focus servo action off condition (step 601). After the focus pull-in action, a focus servo on condition is produced (step 603) and the other servos (spindle servo, tracking servo, and sled servo) are turned on (step 604), and disc reproduction is then performed (step 605). The ordinary gain value A is employed as the focus gain value during the above steps 601 to 604.

Figure 7:
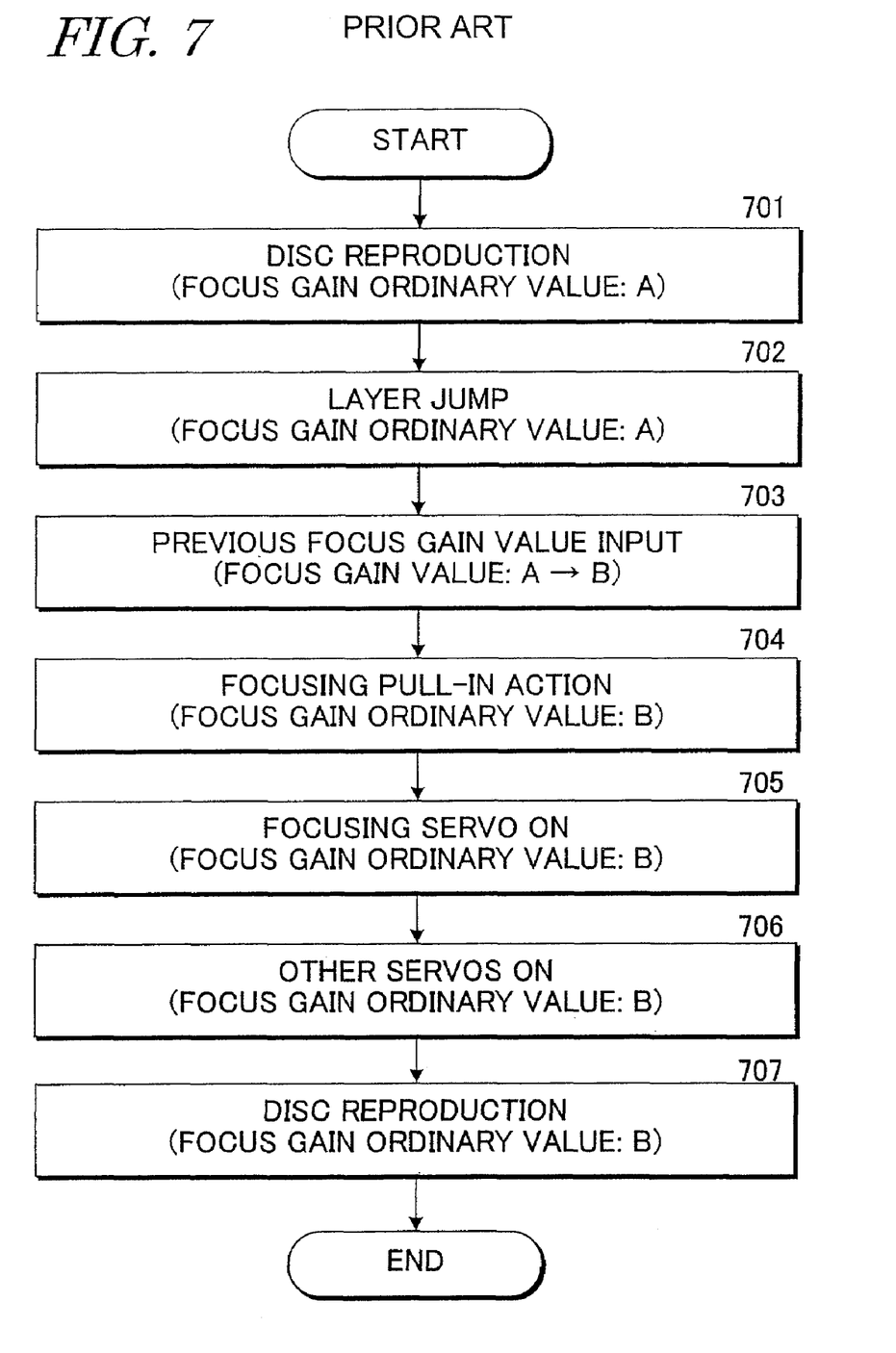
FIG. 7 is a flow chart showing the focus gain setting procedure during layer jumping in the prior art.

The focus gain setting procedure during layer jumping will be described with reference to the flow chart of FIG. 7. Specifically, when layer jumping is performed (step 702) from the condition in which the disc is being reproduced (step 701), using the focus gain value A that is used in the current layer, the focus gain value B on the previous occasion when the actuator drive circuit effected a shift to this layer is input, causing the set value A of the focus gain to be replaced by the new focus gain value B (step 703).

A focus pull-in action is performed using this focus gain value B (step 704), after which the focus servo is put in the on condition (step 705), the other servers are put in the on condition (step 706) and disc reproduction of the layer to which a shift has thus been effected is performed (step 707).

PROBLEM TO BE SOLVED

Figure 8:
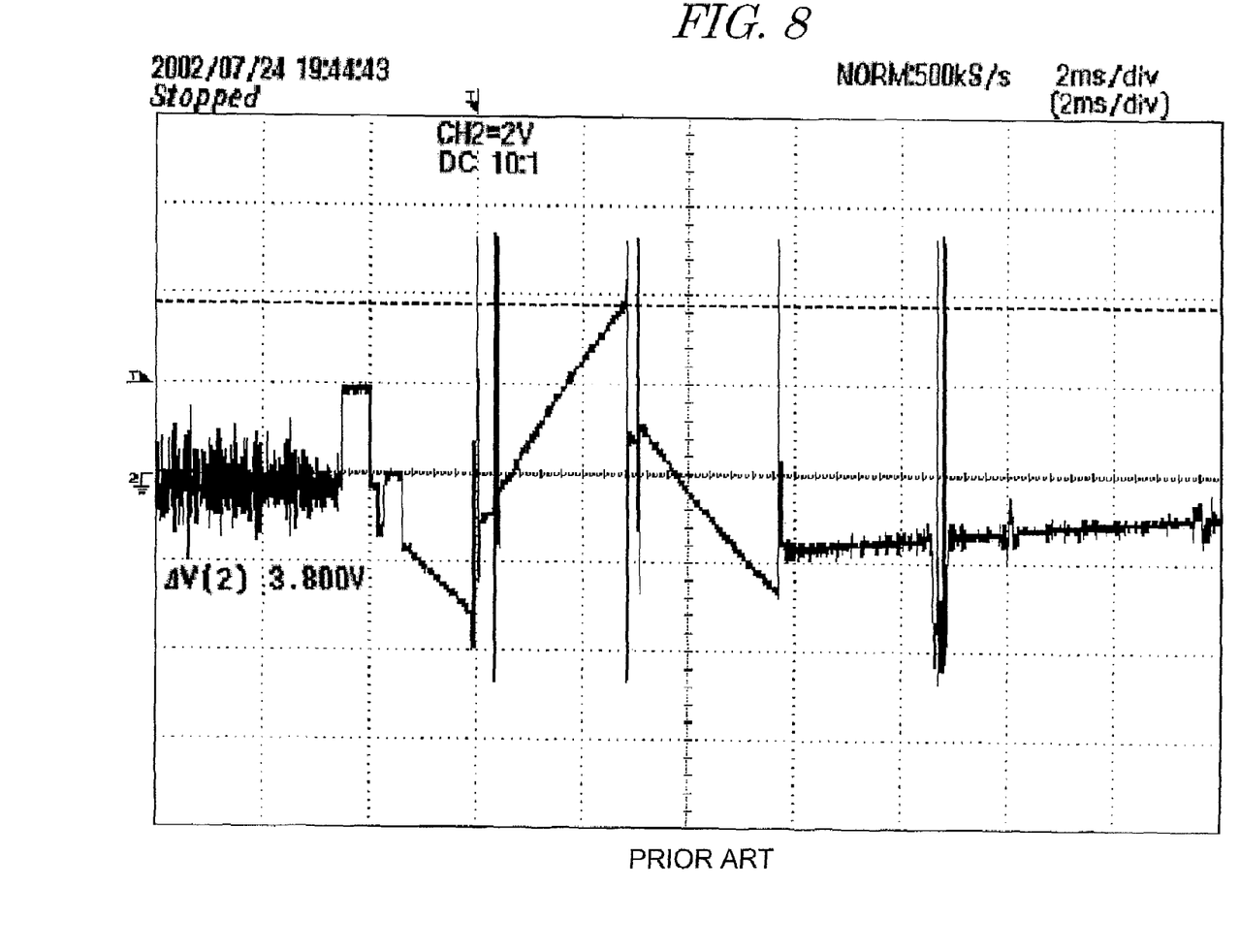
FIG. 8 is a diagram showing an example of the output waveform of the actuator drive voltage in the prior art.

However, as described above, if the focus gain during reproduction is set to gain adapted to a wobble disc, if the focus pull-in action becomes unstable during focus search or layer jumping, there is a possibility of deviation from the control range. For example, the triangular wave shown in FIG. 8 is the output waveform of a focus actuator in such a case: high voltage of about 3.8 V is output. The fine whisker-like waveforms are portions where the actuator does not react.

DISCLOSURE OF THE INVENTION

An object of the present invention is to provide a focus control device and control method and focus control program wherein there is no possibility of deviation from the control range even when the focus pull-in action is unstable.

According to the present invention, a focus control device comprising: an optical pickup that converts reflected light of laser light irradiated onto an optical recording medium to an electrical signal; an optical member that is provided on the optical pickup and emits laser light and receives reflected light; an actuator that drives the optical member; a detection unit that detects the drive signal of the actuator using the electrical signal from the optical pickup; and an actuator drive unit that controls drive of the actuator such that the optical member performs a focus pull-in action using the drive signal is characterized in that it further comprises a focus gain setting unit that sets the focus gain of the drive signal; and a focus gain adjustment unit that adjusts the waveform of the drive signal in focus gain setting by the focus gain setting unit.

According to the present invention as described above, for example deviation of the focus pull-in action from the control range can be prevented by setting the focus gain by adjusting the waveform of the drive signal prior to commencing focus servo action such as during focus search or during layer jumping.

A preferred embodiment is characterized in that the adjustment performed by the focus gain adjustment unit is performed by magnifying the waveform of the drive signal and clipping the portion that exceeds the dynamic range.

In the above mode, deviation from the control range can be reliably prevented while yet ensuring a total gain capable of coping with a wobble disc, by performing ordinary focus gain setting after clipping the portion that exceeds the dynamic range.

DESCRIPTION OF THE PREFERRED EMBODIMENTS

Embodiments in which the present invention is applied are specifically described below with reference to the drawings. It should be noted that, in these embodiments, the optical pickup is controlled by operating a computer and its peripheral circuitry in accordance with a program to implement the functions of the various units described below and the mode of implementation of the hardware and the program could be altered in various ways. Consequently, in the following description, virtual circuit blocks will be employed to implement the various functions of the present invention.

[Construction]

Figure 1:
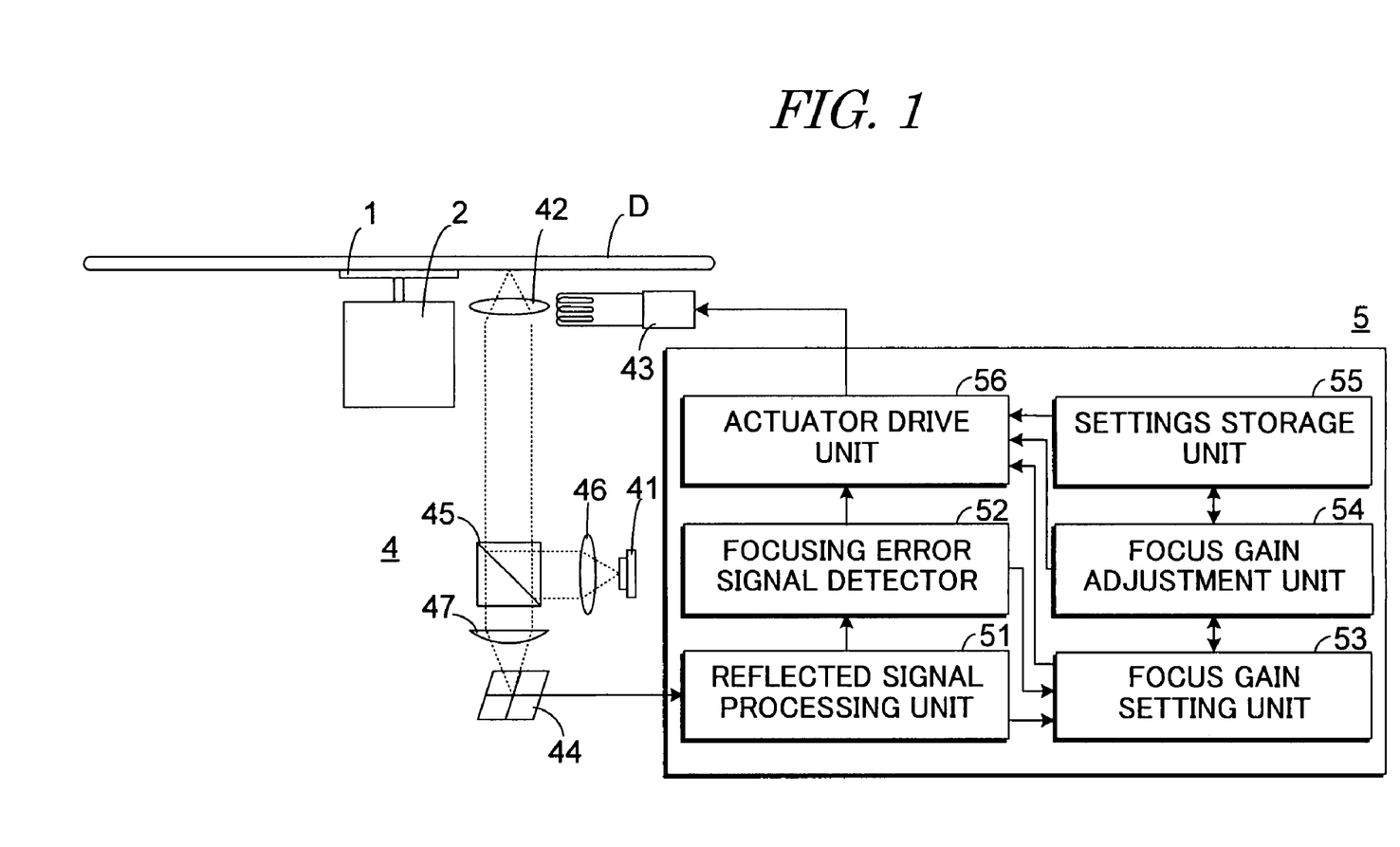
FIG. 1 is a functional block diagram showing an embodiment of a focus control device according to the present invention.

As shown in FIG. 1, the present embodiment consists in a disc device that performs recording and reproduction of information on the recording surface of a disc D that is mounted by a chucking device on a turntable 1, using a control device 5 to cause an optical pickup 4 to perform scanning, while rotating the disc D by means of a spindle motor 2. The optical pickup 4 comprises a laser diode 41, objective lens 42, biaxial actuator 43, detector 44, cylindrical lens 47, collimating lens 46 and beam splitter 45.

The laser diode 41 is a light source that emits laser light irradiated onto the disc D. The objective lens 42 is a lens that concentrates the laser light onto the recording surface of the disc D. The biaxial actuator 43 is an actuator that drives the objective lens 42 by means of drive voltage in two directions, namely, a tracking direction and a focusing direction. The detector 44 is a photodiode that converts the reflected light from the disc D to an electrical signal. The beam splitter 45 is a spectroscope that directs laser light from the laser diode 41 to the objective lens 42 through the collimating lens 46 and directs reflected light from the disc D to the detector 44 through the cylindrical lens 47. Any known technology may be employed for the amplifier for signal amplification and optical pickup feed mechanism etc so a description of these is omitted.

The control device 5 is a device that controls drive of the optical pickup 4 and comprises a reflected signal processing unit 51, focusing error signal detector 52, focus gain setting unit 53, focus gain adjustment unit 54 settings storage unit 55, and actuator drive unit 56. The reflected signal processing unit 51 constitutes means for processing the signal from the detector 44 (RF signal or focusing error signal etc). The focusing error detection unit 52 constitutes means for detecting the focusing error signal from the signal that is input to the reflected signal processing unit 51. The focus gain setting unit 53 constitutes means for setting the gain value of the coefficient constituting the amplification factor in order to amplify the amplitude of the focus error signal to a prescribed value.

Figure 2:
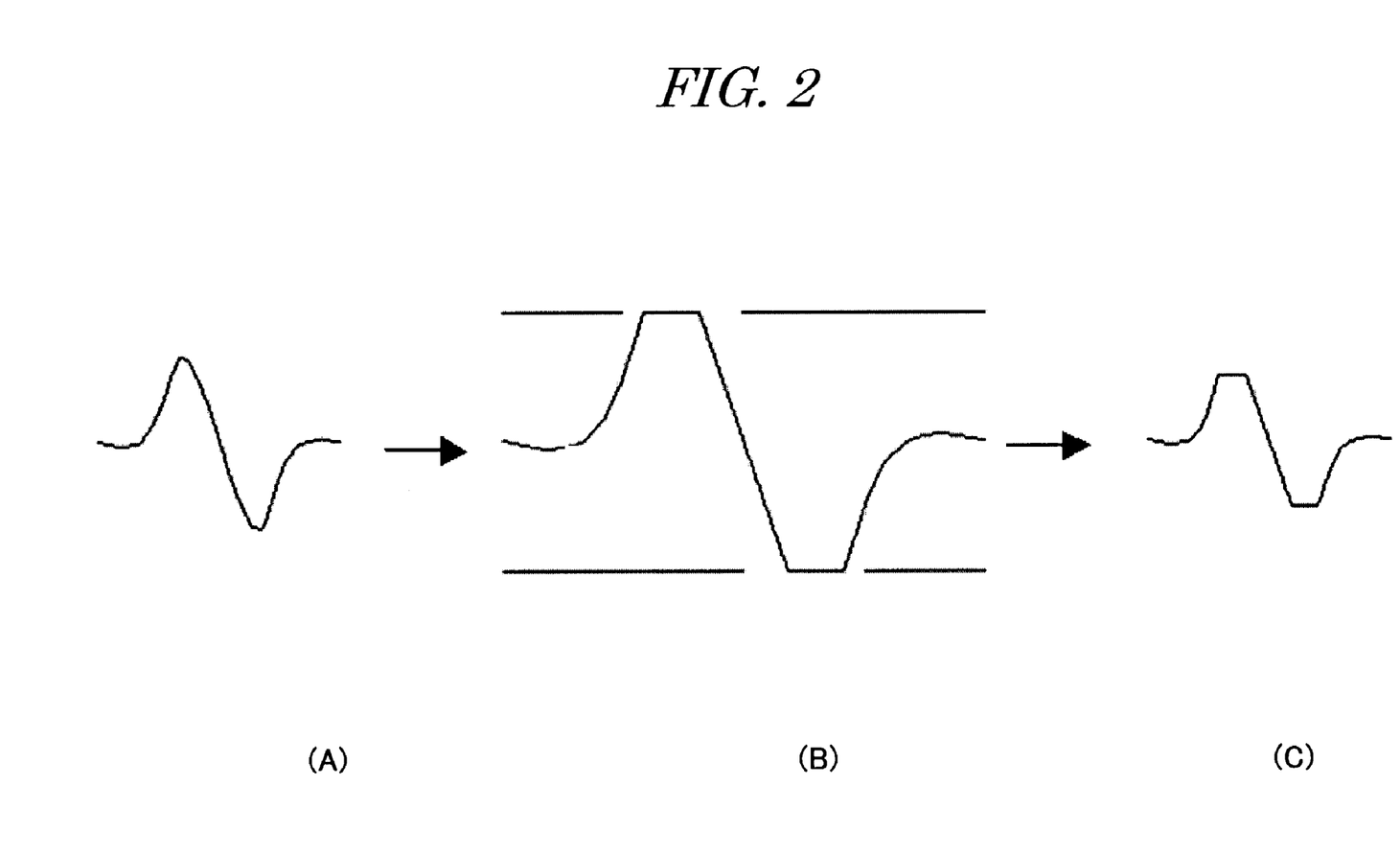
FIG. 2 is a view given in explanation of the adjustment procedure using the focus gain adjustment unit in the embodiment of FIG. 1.

The focus gain adjustment unit 54 constitutes means for adjusting the gain of the focus gain setting unit 53 by using a clipping coefficient. The effect of this adjustment is that, although the total gain is the same as the ordinary coefficient, a limit is applied by the following method to the range of output of the voltage that drives the biaxial actuator 43 and is produced by the actuator drive unit 56. Specifically, whereas normally there is a gain distribution such that the gain in respect of the actuator drive unit 56 is within the dynamic range, the waveform is now made to exceed the dynamic range but the portion exceeding the dynamic range is made flat (clipped) at the time-point where this occurs as shown in FIG. 2(A)'(B). Afterwards, as shown in FIG. 2(B) to (C), the waveform is made smaller, so as to conform to the focus gain using the ordinary coefficient.

Also, the settings storage unit 55 is a memory that stores set values of various types such as the control ranges etc of the focus gain, clipping, defocusing and focusing servo actions. The actuator drive section 56 constitutes means for applying a suitable drive voltage to the biaxial actuator 43 in accordance with the focus error signal and the focus gain value etc. Any known technique may be applied for the construction of the scanning control of the optical pickup 4 in the control device 5 and the other servos (spindle servo, tracking servo, sled servo) etc, so further description thereof is omitted.

[Action]

The action of this embodiment constructed as above will now be described.

[During Focus Search]

Figure 3:
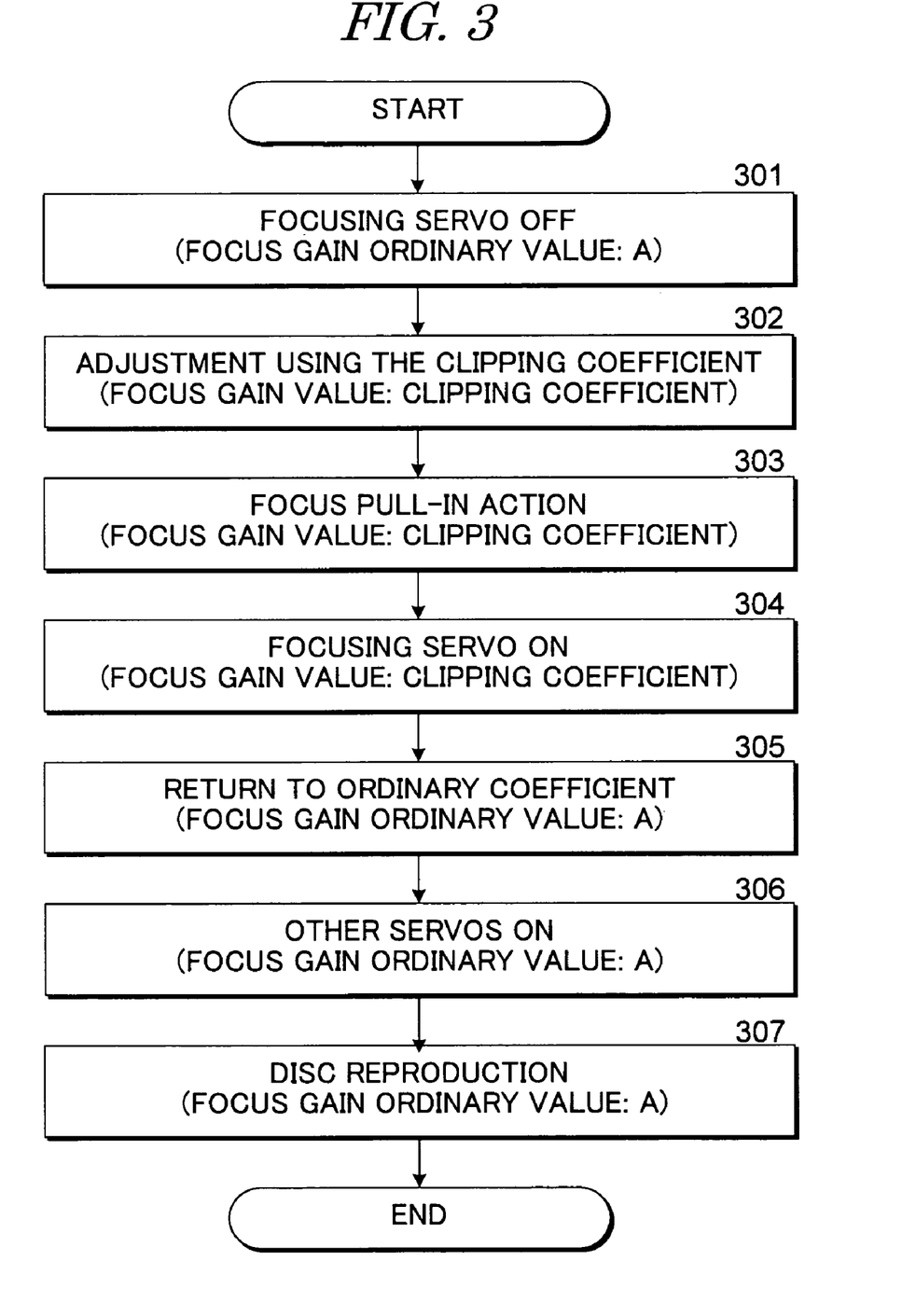
FIG. 3 is a flow chart showing the focus gain setting procedure during focus search in accordance with the embodiment of FIG. 1.

First of all, the focus gain setting procedure during focus search will be described with reference to the flow chart of FIG. 3. Specifically, in the focusing servo off condition, the coefficient A of the ordinary focus gain is stored (step 301) in the setting storage unit 55 as the focus gain value. Then, prior to commencing focus search, as described above, the focus gain adjustment unit 54 uses the clipping coefficient to adjust the focusing error signal for controlling the actuator drive unit 56 (step 302).

Next, the focus search is commenced and the focusing pull-in action is performed (step 303). After focus pull-in, the focusing servo on condition is produced (step 304). In this way, focusing is performed during the period from the focusing pull-in action until the point where the focusing servo is turned on with a focus gain that is adjusted by using the clipping coefficient. Then, after the other servos have been turned on (step 305), the focus gain setting unit 53 sets the focus gain by returning to the ordinary coefficient A (step 306) and disc reproduction is thereby performed (step 307).

[During Layer Jumping]

Figure 4:
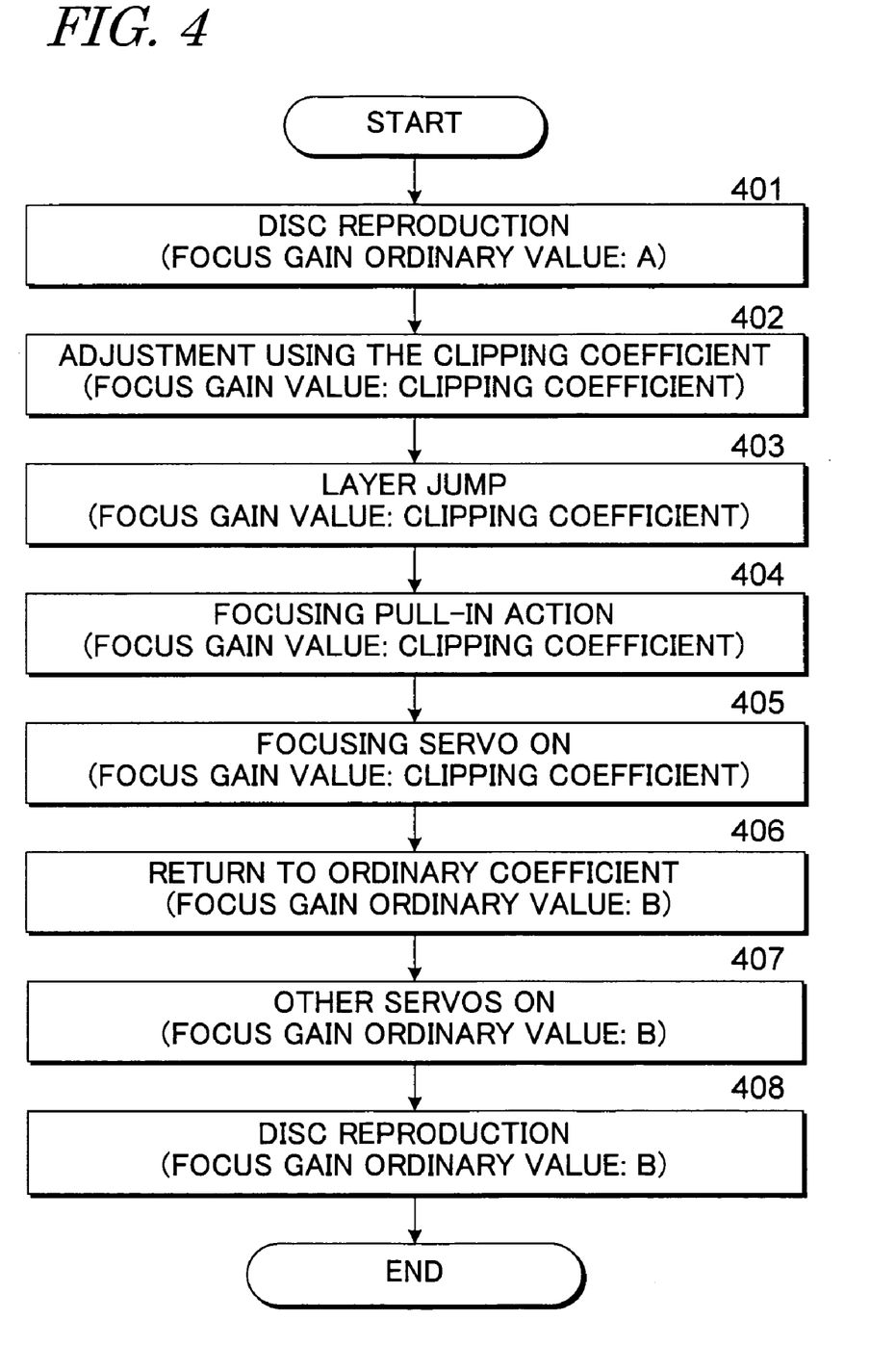
FIG. 4 is a flow chart showing the focus gain setting procedure during layer jumping in accordance with the embodiment of FIG. 1.

Next, the defocusing setting procedure during layer jumping will be described. Specifically, using the focus gain value A in the current layer, from the condition (step 401) in which the disc is being reproduced and prior to performance of layer jumping, the focus gain adjustment unit 54 uses the clipping coefficient to adjust the focusing error signal in order to control the actuator drive unit 56 as described above (step 402).

Next, when layer jumping is performed (step 403), a focusing pull-in action is performed (step 404) to perform focus pull-in, after which the focus servo on condition is produced (step 405). In this way, focusing is performed using a focus gain that has been adjusted using the clipping coefficient during the period from layer jumping to turning on of the focusing servo. The focus gain setting unit 53 then replaces the focus gain value by the coefficient B used on the previous occasion in this layer (step 406). In addition, in the same way as in the prior art, the other servos are turned on (step 407) and reproduction of the layer to which jumping was effected is performed (step 408).

[Output Waveform Data]

Figure 5:
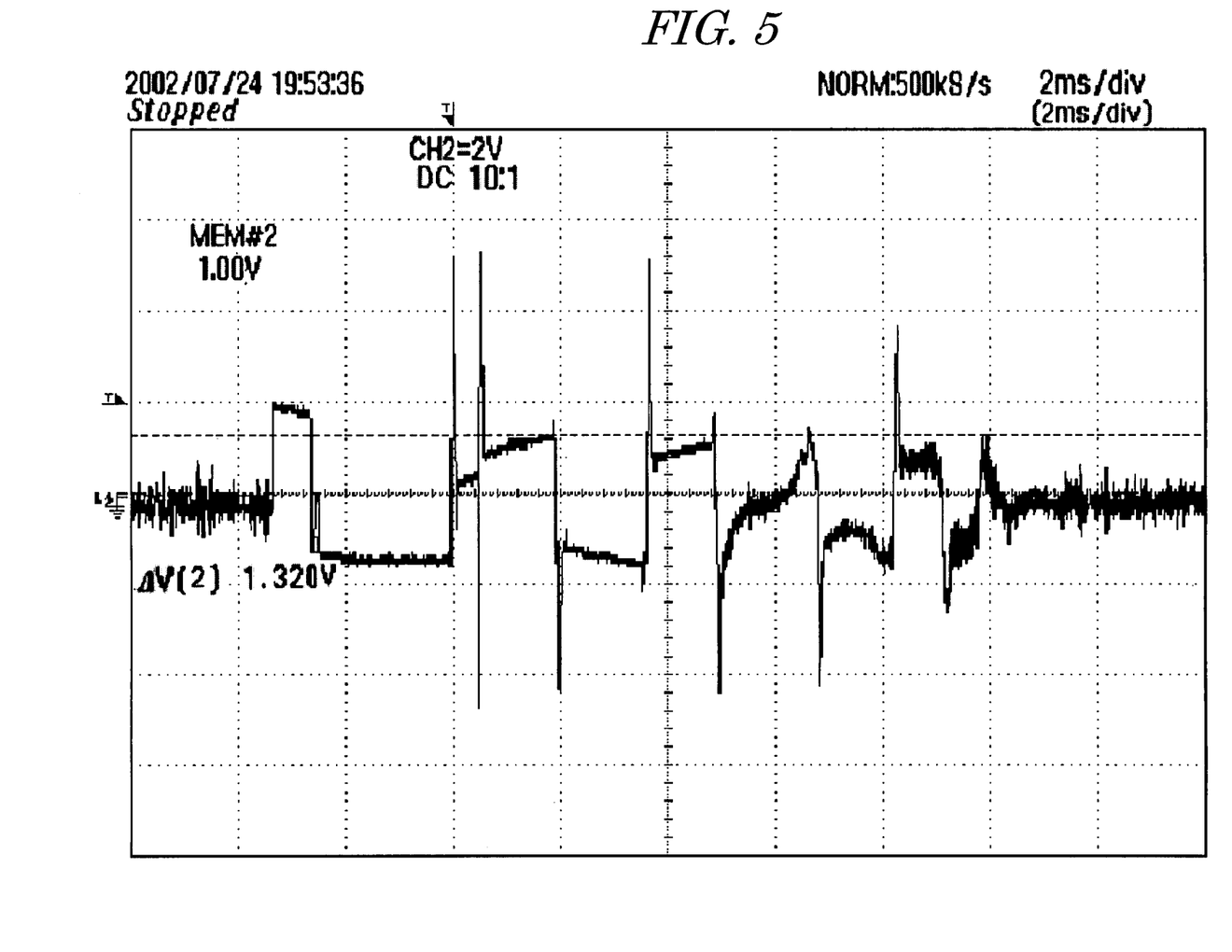
FIG. 5 is a diagram given in explanation of an example of the output waveform of the actuator drive voltage in the embodiment of FIG. 1.

The triangular wave shown in FIG. 5 is an example of the output waveform to the biaxial actuator 43 in the case of instability of focus pull-in in the present embodiment. It can be seen that, at about 1.3 V, only about ⅓ of the voltage of the prior art shown in FIG. 8 is output. The fine whisker-like waveforms are portions where the actuator does not react.

[Effect]

With the present embodiment as described above, deviation of the focus pull-in action from the control range for example prior to the commencement of focusing servo action such as during focus search or during layer jumping can be prevented by performing ordinary focus gain setting using a clipped waveform after setting the focus gain prior to turning on focusing servo action and turning on the focusing servo action. In particular, deviation from the control range can be reliably prevented whilst ensuring a total gain capable of coping with a wobble disc, by ordinary focus gain setting after clipping the portion that exceeds the dynamic range. Consequently, even when the focusing pull-in action is unstable, a situation in which the optical pickup collides with the disc cannot occur.

Other Embodiments

It should be noted that the present invention is not restricted to the embodiment described above. For example, there are no restrictions as to specific construction or numerical values regarding the construction of the optical pickup, the method of detection of the focusing error signal, the range of control of the focusing error signal, the focus gain value or the clipping coefficient. Also, the optical recording media with which the present invention is concerned are not restricted to CDs or DVDs and the present invention could be applied to all types of optical recording media.

INDUSTRIAL APPLICABILITY

According to the present invention, there can be provided a focus control device and control method and focus control program whereby there is no possibility of deviation from the control range even if the focusing pull-in action is unstable.

The invention claimed is:

1. A focus control device comprising:
   an optical pickup that converts reflected light of laser light irradiated onto an optical recording medium to an electrical signal;
   an optical member that is provided on said optical pickup and emits laser light and receives reflected light;
   an actuator that drives said optical member;
   a detection unit that detects a drive signal of said actuator using the electrical signal from said optical pickup; and
   an actuator drive unit that controls drive of said actuator such that said optical member performs a focus pull in action using said drive signal;
   a focus gain setting unit that sets the focus gain of said drive signal; and
   a focus gain adjustment unit that adjusts a waveform of said drive signal in a focus gain setting by said focus gain setting unit, wherein the adjustment performed by said focus gain adjustment unit is performed by magnifying the waveform of said drive signal and clipping any portion that exceeds a predetermined dynamic range and making the waveform smaller before the focusing servo action is performed.

2. The focus control device according to claim 1 further including a focus error detecting unit for detecting a focusing error signal and the focus gain setting unit sets a focus gain value of a coefficient constituting an amplification factor to amplify an amplitude of the focusing error signal.

3. The focus control device according to claim 2 wherein the actuator drive unit applies a drive voltage to the actuator in accordance with the focus error signal and the focus gain value.

4. A focus control device comprising:
   an optical pickup that converts reflected light of laser light irradiated onto an optical recording medium to an electrical signal;
   an optical member that is provided on said optical pickup and emits laser light and receives reflected light;
   an actuator that drives said optical member;
   a detection unit that detects the drive signal of said actuator using the electrical signal from said optical pickup;
   an actuator drive unit that controls drive of said actuator such that said optical member performs a focus pull in action using said drive signal;
   a focus gain setting unit that sets a focus gain of said drive signal;
   a focus gain adjustment unit that adjusts a waveform of said drive signal in a first focus gain setting by said focus gain setting unit; and
   a focus error detecting unit for detecting a focusing error signal, the focus gain setting unit sets a focus gain value of a coefficient constituting an amplification factor to amplify an amplitude of the focusing error signal to a predetermined value and the focus gain adjustment unit sets a clipping coefficient to provide a predetermined dynamic range within the amplification of the amplitude of the focusing error signal during an initial focusing pull-in mode and subsequently, during a focus-servo monitoring of the actuator, a second focus gain setting is used to replace the first focus gain setting wherein the actuator drive unit applies a drive voltage to the actuator in accordance with the focus error signal and the second focus gain setting.

* * * * *